(12) United States Patent
Lee

(10) Patent No.: US 8,001,241 B2
(45) Date of Patent: Aug. 16, 2011

(54) ARRANGEMENT AND A METHOD RELATING TO PERFORMANCE MANAGEMENT BY DISTRIBUTED PROCESSING

(75) Inventor: Brian Lee, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 243 days.

(21) Appl. No.: 12/516,752

(22) PCT Filed: Dec. 5, 2006

(86) PCT No.: PCT/EP2006/069304
§ 371 (c)(1),
(2), (4) Date: May 28, 2009

(87) PCT Pub. No.: WO2008/067848
PCT Pub. Date: Jun. 12, 2008

(65) Prior Publication Data
US 2010/0070624 A1    Mar. 18, 2010

(51) Int. Cl.
*G06F 15/16* (2006.01)
(52) U.S. Cl. .......... 709/224; 709/226; 709/47; 370/219; 370/236; 370/241; 370/216; 370/220
(58) Field of Classification Search ........... 709/224–226
See application file for complete search history.

(56) References Cited

U.S. PATENT DOCUMENTS

| | | | |
|---|---|---|---|
| 5,687,223 A | 11/1997 | Elliott et al. | |
| 6,122,664 A | 9/2000 | Boukobza et al. | |
| 7,453,815 B1 * | 11/2008 | Grabelsky et al. | 370/241 |
| 7,519,855 B2 * | 4/2009 | Gross et al. | 714/10 |

OTHER PUBLICATIONS

PCT International Search Report, dated Aug. 16, 2007, in connection with International Application No. PCT/EP2006/069304.
Farhang, B. et al.: "Policy-Based Quality of Service in 3G Networks" Bell Labs Technology, Bell Laboratories, Murrey Hill, NJ, US, vol. 9, No. 1, May 2004, pp. 31-40, XP001217437. ISSN: 1089-7089.
3GPP Technical Specification TS 32.431, Version 1.1.0, Technical Specification Group Services and System Aspects; Telecommunication management; Performance measurement collection Integration Reference Point (IRP); Requirements, Release 6, Jun. 2004.
3GPP Technical Specification TS 32.104, Version 4.0.0, Technical Specification Group Services and System Aspects; Telecommunication Management; 3G Performance Management (PM), Release 4, Mar. 2001.
Campbell, A. et al.: "A Survey of Programmable Networks", ACM SIGCOMM Computer Communications Review, vol. 29, issue 2, Apr. 1999.

* cited by examiner

*Primary Examiner* — Jude J Jean Gilles
(74) *Attorney, Agent, or Firm* — Potomac Patent Group PLLC

(57) ABSTRACT

The present invention relates to an arrangement for performance management in a communication network comprising a managing system and a number of managed systems. The arrangement comprises collecting means for collecting traffic measurement data and primary processing means for primary processing of measurement data. Said primary processing means are adapted to be distributed and comprise first primary processing means provided in the managing system and a number of second primary processing means provided in a number of managed systems. The arrangement also comprises processing control means for controlling at least allocation of primary processing of measurement data to a first or to a second primary processing means.

29 Claims, 9 Drawing Sheets

ARRANGEMENT AND A METHOD RELATING TO PERFORMANCE MANAGEMENT BY DISTRIBUTED PROCESSING

TECHNICAL FIELD

The present invention relates to an arrangement and a method for performance management in a communication network comprising a managing system and managed systems and which are based on collection of traffic measurement data or statistics.

BACKGROUND

Performance and operation of communication networks and particularly telecommunication networks have to be carefully monitored and studied in order to assure satisfactory functioning of the networks. Vital for the performance and operation of modern communication networks is the collection of traffic measurements. Traffic measurements are used to monitor network performance, to ensure that traffic load is distributed in a desired way in the network. Performance management with traffic measurements can also be used for traffic dimensioning, to ensure provisioning of a desired service quality and contracts, for example service level agreements, and it can also serve as a basis for charge calculations, allocation of resources etc.

Traffic measurements can be of many different kinds. It may depend on the resource or service that is to be measured and different parameters can be measured. Moreover the granularity of the object being monitored may differ considerably from one managed system to another, for example from network element (NE) to all the devices within the NE etc. Entities or objects that are measured may be static, such as for example a switch port, or they may be dynamic, such as for example a communication session, e.g. an RTP (Real Time Transport Protocol) session.

Measurement data also has to be handled or processed somewhere. In known systems this is done in a managing system managing a number of managed systems or network elements. Measurement data then has to be transferred from the location where the measurements were carried out, for example from an NE, to the managing system. It is known to transfer measurement data synchronously, i.e. it may be polled by a management system but it may also be transmitted asynchronously from an NE. Measurements may be transmitted via messages or collectively as a file. The most predominant mode of measurement data transfer in telecommunication networks is via file transfer from a network element to a managing system, for example an OSS (Operation Support System). For third generation mobile networks, it is mandated that measurement data is transferred via file transfer from an NE to an OSS, cf. for example 3GPP TS 32.431 "Telecommunication Management; Performance Measurement Collection Integration Reference Point (IRP); Requirements" and 3GPP TS 32.104 V4.0.0 "Telecommunication Management; 3G Performance Management (PM), (Release 4)". It is also known to record different forms of measurements, counters may be used or the occurrence of certain events may be recorded. Very often the collected raw measurement data from the network has to be handled by primary processing means or be pre-processed in the OSS in order to derive higher level counts or abstractions to provide meaningful data. Such pre-processed measurements are called aggregated measurements and they are formed by combining basic performance management counts in a calculation to form a more complex performance count.

One example of such a measurement in a GSM network is "% Frame Erasure Rate". This measurement indicates what portion (i.e. percentage) of the total dropped calls in an NE are due to frame erasure conditions. It is calculated by inspecting protocol events that occur during the processing of calls by the NE. It is defined as $$100 * \frac{\text{Number of ``Call release events with urgency conditions} = 9 \text{ to } 11\text{''}}{\text{Number of all Call release events}}$$

Aggregated measurements are of different complexity depending on the complexity of the underlying counters. It should be clear that a counter "Number of CS Call release events" is simpler than a counter "Number of CS Call Release events with urgency condition=9-11", since the latter involves examination of the protocol event parameters and the former does not. Some aggregation counters are quite complex and involve the occurrence of a number of conditions in one or more events. To derive such counters, examination of a number of event parameters is required and this in turn necessitates the collection of all data related to these events and the transfer of this data to the OSS from the NE.

It should be clear that there are many applications consuming traffic measurements and the time frame of response of these applications can range from minutes to months. Many OSS applications are used for network and service optimization on timescales of tens of minutes. Data collection periods are typically 15 minutes and in some cases 5 minutes.

However, it is obvious that with the continuously growing sizes as well as complexity of networks a lot of problems are produced, amongst other things as far as performance management is concerned. For several reasons therefore, e.g. due to the response times, size and complexity of real-time network management applications, much more and more frequent data has to be collected. Another reason is that managed systems or network elements tend to become smaller than before and also more than before. For example, $3^{rd}$ generation mobile access networks are expected to reach or exceed 15000 network elements in the short to medium term. This means that an enormous amount of data is needed to provide an overall picture of network performance, and data has to be fetched from most or all network elements in the network. In addition thereto modern networks are diverse in nature. The range of services is greater, network architectures have more layers and there is a greater variety of network nodes. This means that more and different types of measurements are needed and hence also for that reason more data needs to be collected.

Thus enormous amount of data, of many different types, has to be collected often in real time and moreover all this data has to be transferred to the management system, which means that there will be a high amount of data transfer merely for performance management purposes. Thus, capacity limitations can be produced in the communications network between the respective network elements and the OSS. This is becoming a critical issue, as an example a BSC with 7000 Erlang traffic and 70% GPRS traffic subscribers may have an average data transfer rate of 1.2 Mbps between the NE and OSS. In addition thereto capacity problems may be produced in the OSS due to the amount of information that has to be parsed, pre-processed and stored in very short times. There is also a need to produce reports in near real time which places an even greater load on processing and storage resources.

U.S. Pat. No. 5,687,223 for example defines an architecture and a method of selecting data from call data records using rule sets. Rules are used to configure the data fields to be selected for particular services from amongst the complete set of data fields. This is based on a so called generalized statistics engine which essentially is an adjunct processor for handling performance statistics. This solution is however not so efficient, simple and flexible and it will also easily involve capacity limitations. The amounts of data that need to be transferred will also be far too large.

SUMMARY

It is therefore an object of the present invention to suggest an arrangement for performance management which is efficient and which enables management of large amounts of data. It is particularly an object of the invention to provide an arrangement for performance management which is capable of frequent collection of data and which functions irrespectively of the degree of complexity of networks, i.e. which also is able to handle complex networks with a large number of small network elements.

It is also an object to provide an arrangement for performance management well capable of real-time management and which keeps down the amount of transmission resources needed for performance management.

It is also an object to provide a performance management solution for high diversity networks offering many different kinds of services etc.

Particularly it is an object of the invention to provide a managing and a managed system respectively supporting performance management and through which one or more of the above mentioned objects can be achieved, as well as a method through which one or more of the above mentioned objects can be achieved.

In order to meet one or more of the above mentioned objects, the present invention suggests an arrangement for performance management to be used in a communication network with one or more managing systems, each managing a number of managed systems. The arrangement comprises collecting means for collecting traffic measurement data and primary processing means for primary processing of measurement data. According to the invention the primary processing means are adapted to be distributed and comprise first primary processing means provided in the managing system (this may be optional) and a number of second primary processing means provided in a number of managed systems. It also comprises processing control means for controlling at least allocation of primary processing of measurement data to a first (if provisioned) or to a second primary processing means.

The invention also suggests a managed system in a communication network which comprises or communicates with collecting means adapted to collect traffic measurement data for performance management purposes. The managed system comprises second primary processing means for primary processing of collected traffic measurement data and processing control means are provided for determining at least if/when and/or how primary processing is to be performed in the second primary processing means.

The invention also provides a managing system, in a communications network as discussed above, which is adapted to manage a number of managed systems and comprises first primary processing means for primary processing of collected traffic measurement data. The managing system comprises processing control or managing means adapted to generate or provide and/or manage allocation handling control information and/or to distribute said allocation handling control information to second, managed, processing control means, for allocating primary processing of measurement data to a first primary processing means (optional) or to a second primary processing means provided in a managed system. In a particular implementation it comprises a management interface for distributing said allocation handling control information to a managed system.

It should be clear that the invention also covers cases when there is no first primary processing means in the managing system, where all primary processing has been delegated to primary processing means in managed systems.

It is an advantage of the invention that performance management is improved and facilitated compared to known centralized systems. It is particularly an advantage of the invention that performance management can be handled in an easy and flexible manner also in large networks and even more particularly in complex networks with a large number of small network elements. It is also an advantage of the invention that an arrangement and a method for performance management are provided which can handle short response times of real time network management applications and which provide for a flexible and easy performance management also when there is a huge amount of data to be collected often and even more particularly when different kinds of data need to be collected often and from many locations.

It is also an advantage of the invention that performance management can be handled in an easy, flexible and straight-forward manner also in modern highly diversified networks supporting a large amount of different services and including a great variety of network nodes. A particular advantage of the present invention is that it allows a service provider to operate a performance management system in a desired manner. It is also an advantage that performance management can be provided for in an efficient manner without unduly loading transmission resources within the network, i.e. that the load on the transmission network will be low even if there is a very large number of network elements and if a large number of different types of measurements need to be done, possibly frequently.

BRIEF DESCRIPTION OF THE DRAWINGS

The invention will in the following be further explained, in a non-limiting manner, and with reference to the accompanying drawings, in which.

DETAILED DESCRIPTION

Figure 1:
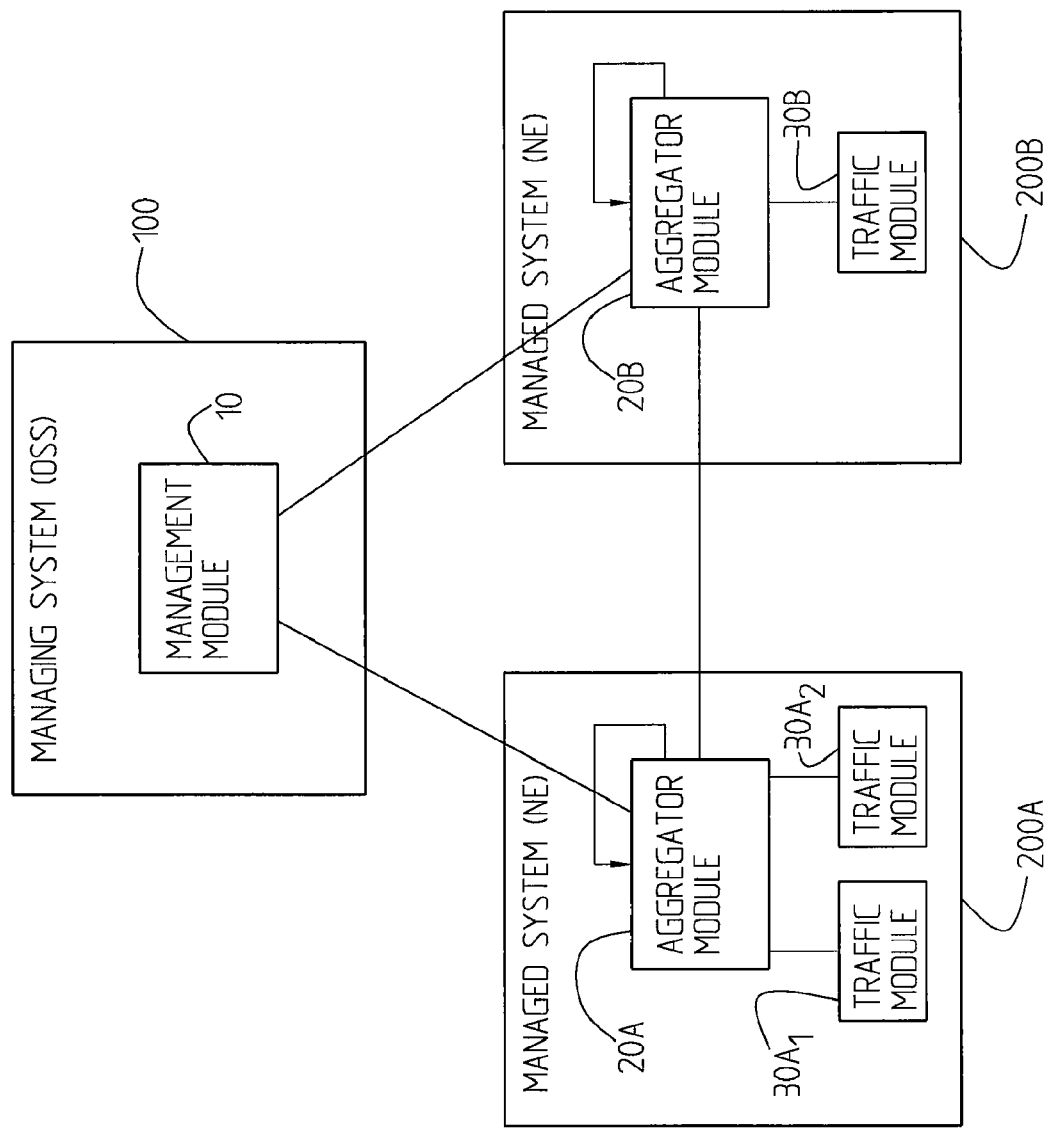
FIG. 1 is a very schematical overview of the implementation of an arrangement according to the invention, FIG. 2 schematically illustrates an implementation of the inventive concept in a telecommunication network.

In a most advantageous implementation of the present invention, as will be exemplified with reference to the drawings below, the processing control means may be adapted to allocate primary processing of measurement data to a first and/or primary processing means based on one or more policies or policy rules. This means that a flexible placement of measurement calculations in the performance management architecture is obtained with use of policy rules. According to the invention primary processing or calculation is done either in the network, particularly managed systems or network elements, or in a managing system, for example an OSS. It should be clear that the inventive concept also covers cases when all primary processing is done in a managed system, either because there is no support for primary processing in the managing system or because the/a policy dictates that all processing is to be done in a managed system. The policy or policies, particularly policy rules, may comprise one or more predetermined conditions. The policy rules or conditions may relate to different factors or parameters. A policy may relate to or comprise several different policy rules or conditions. In one embodiment at least some of the policy rules or conditions relate to current parameter conditions, for example current conditions in a first processing means or in a second processing means or current conditions in a second processing means as compared to the corresponding current conditions in a first processing means. Current conditions are for example current processing capacities, current sizes of managed systems where second processing means are located, current load, current amount of measurement data etc. Another example of a condition of a policy rule is that measurements using an amount of data exceeding a given threshold value are to be processed in a second primary processing means, or vice versa measurements using an amount of data falling below a given threshold value may be processed in a first primary processing means. Another condition may relate to measurements based on a given number of different types of measurements, for example measurement of events, and/or incorporate other primary or pre-processed measurements. Measurements may be performed continuously, at discrete occasions or spontaneously, e.g. at occurrence of some event.

In an exemplary embodiment, the (first and) second processing means are adapted to be controlled by policy rules relating to one or more of network size, number of managed systems (network elements), network load, type of managed system, respective processing capacity of the (first and) second processing means, relative processing capacity of a managed system/managing system etc. Threshold values may be given for one or more of said parameters, below or above which processing is to be performed in a first or second processing means, as given by the rule.

Preferably at least the second primary processing means comprise calculation means for performing aggregation calculation of measurements. Alternatively also the first primary processing means comprise such calculation means.

Most particularly the policies or policy rules further comprise processing rules defining calculation or processing of measurements, i.e. how the processing or calculation is to be carried out.

Advantageously the processing control means of the arrangement comprise first processing control means which are adapted to generate or provide said policies or policy rules and to distribute said policies or policy rules over a management interface to second processing control means which comprises an execution engine in or communicating with said respective second processing means.

In an alternative implementation the first processing control means also comprises an execution engine. In still another embodiment the first as well as the second processing control means comprise an execution engine. In case of a conflict, e.g. if policies are executed in the first processing control means and in the second processing control means, a conflict may arise, e.g. about which means is handling the policies, the conflict is preferably (but not necessarily) handled by the OSS. Said first processing control means may comprise a management module provided in the, or a, managing system which further is adapted to generate and manage said policies or policy rules (or conditions) and preferably also to control generation and management of said processing rules, for example by aggregation measurement formulaes, also called Amlets. The second processing control means are particularly located in the respective managed systems or network elements and communicate with said first processing control means over the management interface. Particularly each second primary processing means and respective collecting means are provided in or comprise a respective aggregator module provided in a managed system (or network element as referred to above). The first and second control means particularly comprise distributed control means.

In a specific embodiment the second primary processing means of the aggregator modules comprises a respective traffic module interface for communication with a traffic module which comprises control plane processing means and user plane processing means which is adapted to communicate with or comprise control plane and user plane measurement collecting means respectively. The measurement collecting means preferably comprises counters and/or event based counters.

The invention also suggests a managed system in a communication network comprising or communicating with collecting means adapted to collect traffic measurement data for performance management purposes. The managed system comprises second primary processing means for primary processing of collected traffic measurement data and processing control means are provided for controlling or determining at least if/when and/or how primary processing is to be performed in the second primary processing means.

The invention also provides a method for performance management in a communication network comprising a managing system and a number of managed systems and which comprises means for collecting traffic measurement data. According to the invention the method comprises the steps of; generating or providing allocation and/or handling control information for determining if measurement data is to be handled by primary processing in the managing system or in a managed system (handled by primary processing generally means that it is pre-processed); providing said allocation and/or handling control information to managed systems supporting primary processing for execution, and/or executing said allocation and/or handling control information in a managing system; handling collected measurement data through primary processing in a managed system or in the managing system as determined by the allocation and/or handling control information. The allocation and/or handling control information particularly comprises policies or policy rules.

It should be clear that the above described preferred or alternative implementations also are applicable with respect to the managed system, the managing system and the method respectively.

Thus, according to different embodiments only the managed systems are capable of executing e.g. policies, or only the managing system or both. In case of conflict, if both are capable of executing policies, this is advantageously handled by OSS. Decisions are preferably made in real time.

FIG. 1 illustrates one example of how the inventive concept can be implemented. The arrangement for performance management here comprises a management module 10 which is located in managing system 100, for example an OSS (Operations Support System), which however itself does not form part of the present invention. The arrangement further comprises an aggregator module 20A, in this particular case also an aggregator module 20B, which aggregator modules 20A, 20B are located in respective managed systems 200A, 200B. The aggregator module 20A is in communication with traffic module $30A_1$ and the traffic module $30A_2$, whereas the aggregator module 20B is in communication with a traffic module 30B. It should be clear that the number of traffic modules is of no significance, any aggregator module may be connected to any number of traffic modules, one or more. The traffic module here includes the actual measurement collection means. In this implementation it is illustrated that the aggregator module 20A, 20B are inter-connected or able to interact. This relates to an optional feature.

The management module 10 comprises means responsible for creation and management of policy rules, and in preferred embodiments also so called aggregated measurement formula which in the following are denoted Amlets. In one embodiment it supports policy execution, in another embodiment it does not support policy execution. The aggregator module 20A, 20B is responsible for capturing performance management data (measurement data or statistics) and performing the respective required processing, for example aggregation calculations. The traffic module here represents a device and technology abstraction of a network element to facilitate interaction with the performance management architecture. According to the invention a general framework is described which allows primary processing, aggregation calculation and processing of aggregated measurements, to be pushed down into the network elements, and at least theoretically even out to the user equipment (not shown). The processing means form a network of performance management processors, and for example calculation of aggregated measurements can be carried out in a distributed manner. In agreement with policy rules, the aggregator module may be responsible for capturing the measurement data or performance management data from traffic modules and to perform, if applicable according to the relevant policies, an aggregation calculation.

In particular embodiments (not shown), aggregator modules can be cascaded in order to allow for hierarchical aggregation to take place, and be used to adapt the aggregation to hierarchical networks.

The various modules described as logical entities below can be mapped to a large variety of physical form factors.

Generally the invention can be seen as based on programmable networking, which is a general term concerning the capability to rapidly create, deploy and manage novel services in response to user demands, as for example described in Campbell A et al., "A Survey of Programmable Networks", ACM SIGCOMM Computer Communications Review Vol. 29 issue 2, April 1999, by service providers or trusted third parties. A programmable network offers an open API (Application Programming Interface) to service programmers to facilitate service creation. Programmable networking techniques have been used for network management as well as service creation and may include the approaches of open signalling, active networking, "simple" mobile agents and policy management. Common for different programmable networking techniques are network level API's which allow services/applications to be created. Generally a programmable network consists of a number of programmable nodes each exporting an API or virtual machine. Each node provides an execution environment (EE) providing the resources and support that the application programs need. Basic is also a programming model to enable the creation of services/applications. The programming model defines the type of program entity, for example packet, policy, agent etc., the programming language, the division of intelligence between the node and the program.

The present invention implements the concept of a programming model, an execution environment and a management architecture enabling distributed calculation of aggregation measurements in specific embodiments, more generally, distributed primary processing of measurement data.

According to the present invention the intelligence can be said to reside in the network nodes as a number of service components and control scripts, regarded as mobile agents, which are comparatively simple and which are downloaded to invoke the components to implement a service. Policy rules and particularly also Amlets are here considered as simple mobile agents that may be downloaded to managed systems or network elements from a managing system, e.g. OSS.

Figure 2:
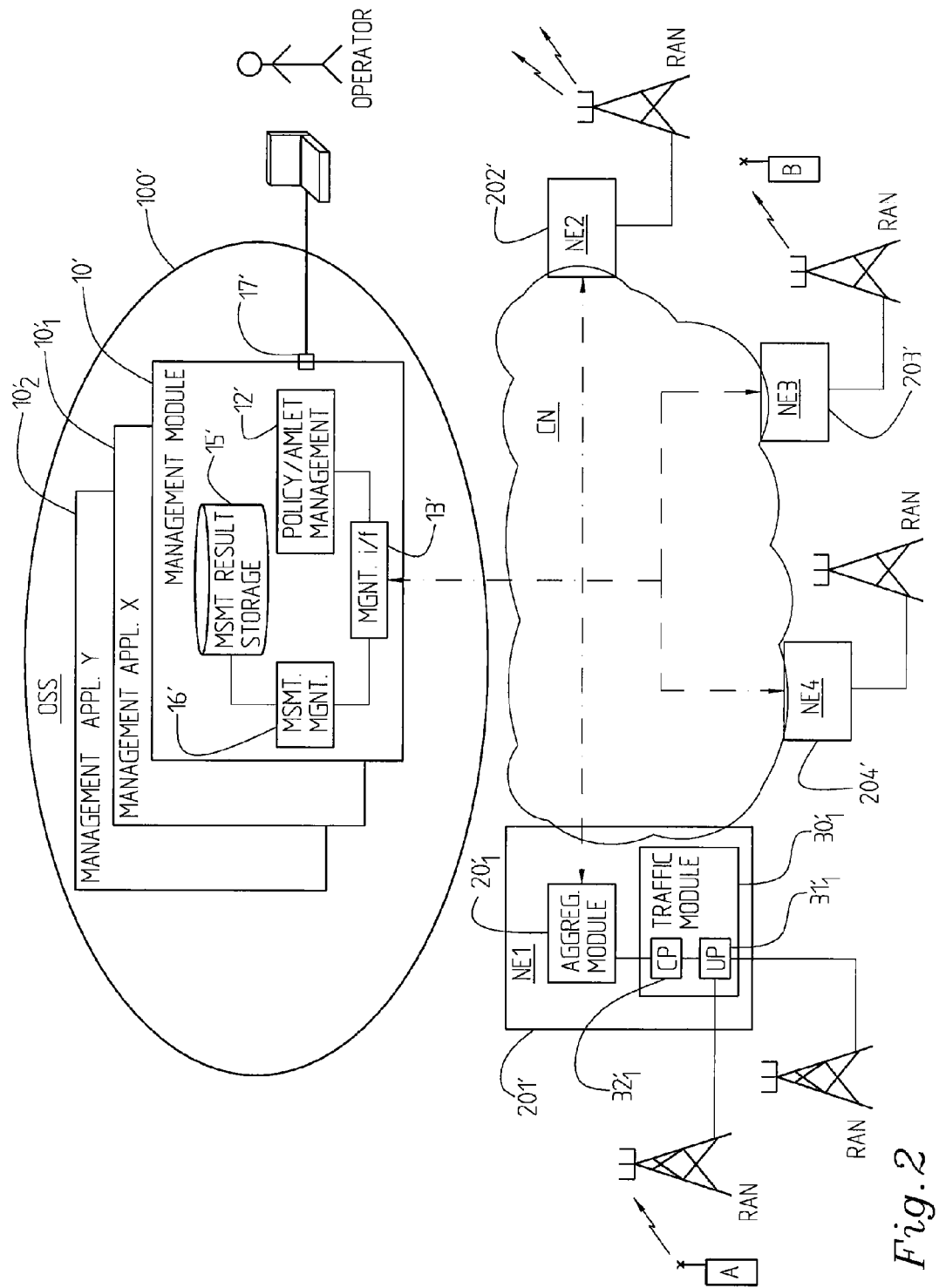

FIG. 2 is a schematical block diagram showing an OSS 100' (or a network management center) and a number of network elements NE1 201', NE2 202', NE3 203' and NE4 204' interconnected over a core network CN. The performance management arrangement according to the present invention comprises a management module 10' (cf. also FIG. 3 and FIG. 4 below) provided in OSS 100'. As will be more thoroughly described in FIG. 4, the management module 10' comprises a measurement management sub-module 16', a management interface 13', a policy and an Amlet management sub-module 12' which handles management of policies and Amlets (it should be noted that it is not limited to handle Amlets as well, in other embodiments it only handles policies). The management module 10' also comprises a measurement result storage 15'. In addition to the management module, particularly a policy management module, other management applications, here denoted X,Y; $10_1'$, $10_2'$ may be provided. Operator/instructions for the creation of policies (and Amlets) are provided to the management module 10' over an operator interface 17'. In FIG. 2 one of the network elements, NE1 201', is illustrated more in detail than the other network elements NE2-NE4 202',203',204' which may be constructed substantially in the same manner as NE1. NE1 201' here comprises a traffic module 30' with a control plane processor CP $32_1'$ and a user plane or a traffic processor UP $31_1'$. The network element NE1 201' also comprises an aggregator module $20_1'$ as will be more thoroughly explained with reference for example to FIG. 4 below. It should be clear that the aggregator module does not have to be provided in the network element 201' itself, it might also be located outside the network element but in communication with the traffic module 30' provided in the network element 201'. The network element NE1 is here supposed to be a traffic controlling network element. It should be clear that the inventive concept is not limited to any specific network elements, on the contrary network elements may be of many different kinds. For example it may comprise a RBS (Radio Base Station), an RNC (Radio Network Controller), a 3G GGSN (Gateway GPRS Support Node), an SGSN (Serving GPRS Support Node), a CGSN (Combined GPRS Support Node), any router, an ATM (Asynchronous Transfer Mode) switch etc.

The control plane handles set-up and take down of communication paths, for example reserve resources etc. and when a "path" has been set-up, information thereon is provided to the aggregator module $20_1'$.

By interaction with the policy operator over the operator interface 17' one or more policies are generated or created in the management module 10'. It should be clear that this be can be very complicated, there may be different policies for different network elements etc. However, once the policies and/or Amlets have been generated, they are distributed over the management interface 13' in any appropriate manner, e.g. pushed, to the respective network elements, more particularly to the aggregator modules in or associated with the network elements, which is illustrated by the dashed-dotted arrows indicating the information flow between the management module and the aggregator modules. It should be clear that information also flows to the management module once measurements have been done. If, according to the respective policies applicable for a network element, e.g. NE1 201', processing is to be done in the management module or OSS, (or cannot be done in NE1) measurement data is forwarded directly from the concerned traffic module to first primary processing means (not shown) in the management module. On the other hand, if, according to the applicable policy, measurement data from the traffic module can be pre-processed or exposed to primary processing in second primary processing or execution means of NE1 (provided in the aggregator module, not shown in this fig, cf. FIG. 3,4 below), the results of the primary processing are, possibly after caching in a measurement cache (not shown in FIG. 2), provided to the management module 10'.

Thus, according to the conditions of the policies provided to the network elements, more particularly to the aggregator modules which are located externally of the network element, in a control management layer above the traffic layer, or in the network element, it is determined if primary processing is to be done by the aggregator module 21' or by primary processing means in the management module 10'. If the conditions for primary processing in an aggregator module are not fulfilled, measurement data is simply provided to or pushed-up to the management module without any primary processing, whereas if the applicable conditions for distributed primary processing, i.e. processing in an aggregator module, are fulfilled, the results of the primary processing are provided or pushed to the management module. A, B in the figure merely indicate mobile communication devices connected over respective RAN (Radio Access Network).

Figure 3:
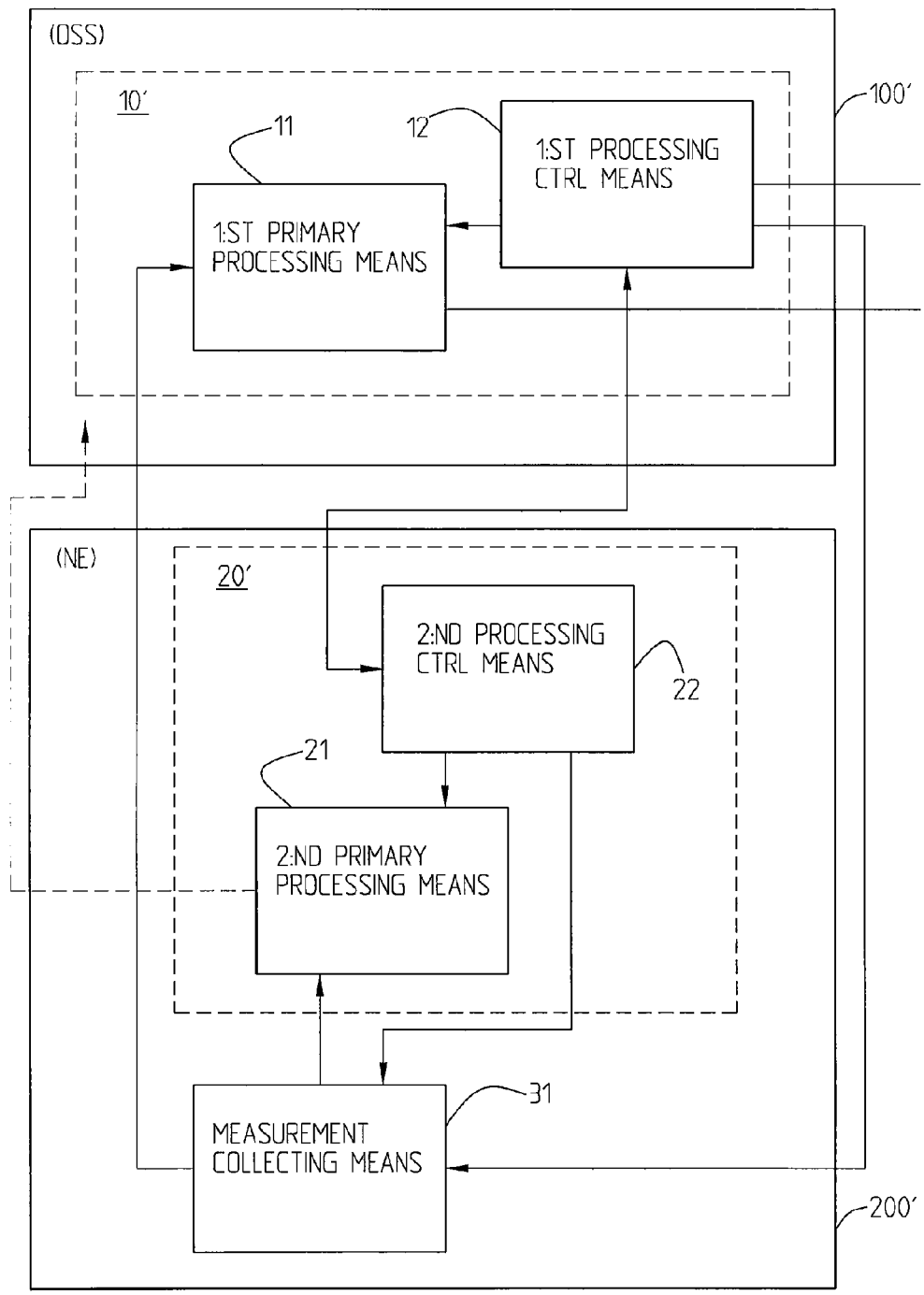
FIG. 3 shows a general implementation of the inventive arrangement according to one embodiment of the invention.

FIG. 3 is a schematical block diagram describing in general terms an implementation of an arrangement according to the inventive concept. In an OSS a management module 10' is implemented which comprises first primary processing means 11 (optional) and first processing control means 12 also denoted processing control managing means. In the state of the art systems, primary processing or pre-processing is always carried out in the OSS, whereas here the primary processing means are distributed and second primary processing means 21 are provided in for example a network element NE. Second processing control means 22 here communicate with the first processing control means 12. Particularly the second processing control means 22 and the second primary processing means 21 are provided in an aggregator module 20' as discussed above. The aggregator module 20' is connected to a measurement collecting means 31. Policies or policy rules and possibly, but not necessarily, also Amlets or similar are generated and managed in the first processing control means 12 and downloaded or provided to second processing control means 22, where the policies are used to determined whether the primary processing is to be carried out in the second primary processing means 21 or not and possibly also to determine how processing or calculations are to be performed.

In alternative embodiments the decisions may be made in the first processing control means 12 instead (or additionally). Although the inventive concept is not limited thereto, in particularly advantageous implementations aggregated measurement formulae (Amlets) are also handled and distributed.

Amlets may e.g. be written in a scripting language as shown below. The instructions of the virtual machine defined by the language are shown in bold.

```
Amlet AmExample
{
real c1;
  define M1 as {EventType1.parameterY == value1};
  define M2 as {EventType2.parameterX == EventType2.paremeterZ}
  define M3 as {EventType3.parameterA > value2}
  subscribe(M1,M2,M3);
  inputEvent{
     doCalc(measReceiver)->{
            c1=(get(M1)+get(M2)+get(M3))/100;
            send(measReceiver,calcExample,c1);
     }
     deactivate_rule->{
            unsubscribe(M1,M2,M3);
            exit( );
     }
}//inputEvent
}
```

The Amlet keyword here defines an aggregation measurement formula in the language.

The define keyword enables definition of counters that are used in the Amlet. These counters are defined in terms of protocol events or as underlying NE counters and the definition expresses the counters in terms of the NE programming environment entities representing the counters. This enables the generation of EE (Execution Environment) software (e.g. Java classes) to access the required data. The entities defined by this keyword can be regarded as EE service components which thereafter can be invoked by the actual Amlet script. Particularly the components are defined in a central library or similar and imported to individual Amlets.

The subscribe keyword instructs the underlying Amlet virtual machine (AVM) to listen for these events and it causes the AVM to subscribe to these events in the traffic module as described above.

The inputEvent keyword defines an event handling loop to enable an Amlet to respond to events in its environment.

The get keyword enables retrieval of the desired value from the underlying counter service component.

The send keyword transfers the Amlet result to an underlying communication mechanism for transfer to the next module in the chain.

The unsubscribe keyword removes subscriptions in the event the Amlet is deactivated.

The exit keyword releases any other resources in the event the Amlet is deactivated.

Policies are based on the same scripting language as Amlets, but they do not share all language statements. Below is shown an example of a policy rule. This particular policy rule states that if the load in the managed system in the NE is below a certain threshold, it is allowable to perform local evaluation of Amlets, or more generally to perform primary processing in a second processing means, whereas if the load is above a certain threshold, the Amlets may not be evaluated in the NE.

```
Rule PolicyExample
{
    const lowLoad=30;
    const highLoad=60;
    subscribe (NeLoad);
    inputEvent {
        NeLoad (load) -> {
            get ( AmState);
            If ((load < lowLoad) && (AmState=off) then
                send(OSS, EE_status, activateAmlet)
            else if ((load > highLoad && (AmState=on) then
                send (OSS,EE_status, deactiveAmlet)
        }
        deactivate_Rule -> {
            unsubscribe(NeLoad);
            exit( );
        }
    } // inputEvent
} // Rule
```

Policies are defined with the keyword Rule.

There may be many different kinds of policies or policy rules for example in the form of conditions which also may take many different forms. Above merely one particular example was shown.

Figure 4:
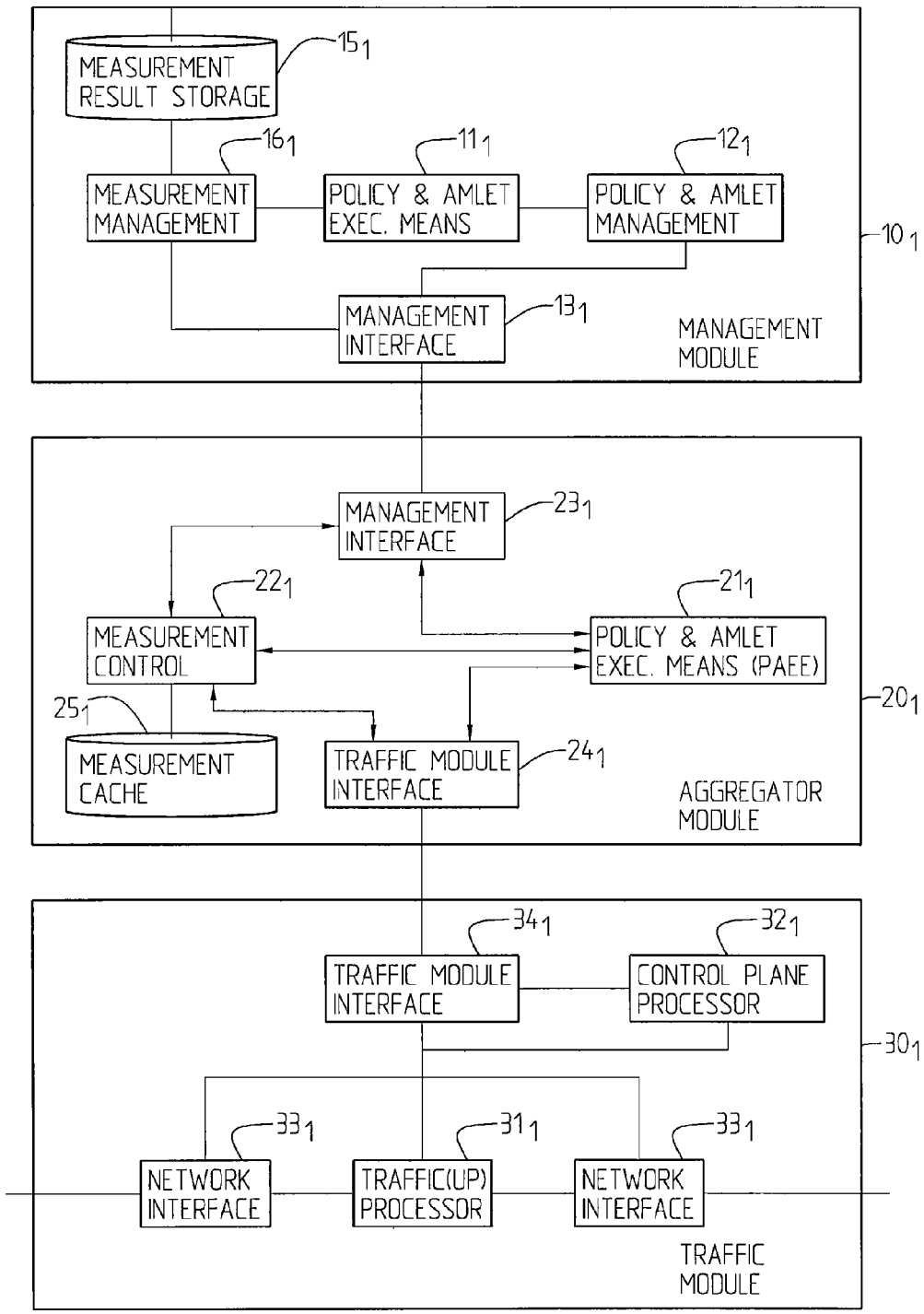
FIG. 4 is a block diagram of one particular implementation of an arrangement according to the present invention.

FIG. 4 shows one implementation of an arrangement for performance management according to the present invention. It comprises a management module $10_1$, particularly implemented in an OSS, an aggregator module $20_1$ implemented in a network element and a traffic module $30_1$ which is a module abstracting the traffic machine on which measurements are made, which particularly also can be seen as implemented in a network element. This embodiment is supposed to include also so called Amlets as discussed above. In realistic implementations there are normally a plurality of aggregator modules in respective NEs (of which at least some may communicate with each other).

Aggregation measurements form part of a more comprehensive performance management system. The extra functions of this management system included through the aggregation measurements are not to be seen as limiting the scope of the present invention although it relates to a particular, advantageous embodiment. Calculation of, here, aggregated measurements can also be done in the OSS, i.e. in the policy and Amlet execution means $11_1$.

The management module $10_1$ is, in a conventional manner, responsible for scheduling, fetching and storing of calculated results and for post-processing of the retrieved results, which is inherent in any performance management system. However, according to the present invention the management module is here additionally responsible for creation and deployment of Amlets. The management module $10_1$ is here supposed to contain, in addition to execution means $11_1$, four sub-modules. The measurement management module $16_1$ is responsible for scheduling, fetching and storing of calculated results and post-processing of retrieved results which then are stored in measurement result storage $15_1$. The policy and Amlet management sub-module $12_1$ (first processing control means) is responsible for creation and management of policy rules and Amlets and it will be more thoroughly described below. The management module also comprises a management interface $13_1$ which contains functions and protocols for enabling communication with the aggregator module $20_1$ which for example is provided in a network element which comprises a number of communication mechanisms needed for enabling such communication.

The aggregator module $20_1$ also comprises, here, four sub-modules. A first sub-module is a management interface $23_1$ for communication with the management module $10_1$ containing functions and protocols for communication therewith. It also comprises the traffic interface $24_1$ which provides an interface to the traffic module and allows for integration of different NE types. The aggregator module further comprises a measurement control sub-module, adapted $22_1$ to facilitate measure management and interaction with the measurement management module $16_1$ of the management module $10_1$. The measurement control module $22_1$ comprises a functionality assisting in or enabling the policy and Amlet system to function. The aggregator module $20_1$ further comprises second primary processing means or execution means, here comprising a policy and Amlet execution engine $21_1$ comprising the functions needed to enable policy rule and Amlet implementation. The second processing control means referred to e.g. in FIG. 3, may e.g. be seen as included in policy and Amlet execution means $21_1$.

The traffic module $30_1$ comprises a number of sub-modules comprising network interfaces $33_1$, a traffic module interface $34_1$ enabling communication with the aggregator module via its traffic module interface $34_1$ and in addition thereto a control plane processor $32_1$ and a traffic user plane (or traffic) processor $31_1$. The data plane is adapted to transfer user or application data whereas the control plane comprises protocols for managing the network traffic. Measurements can be made in both planes. Mostly, but not exclusively, event based counters are mostly related to the control plane since it contains the traffic protocols.

Some of the sub-modules will now be described, for exemplifying reasons, i.e. specific embodiments, in a more detailed manner.

Figure 5:
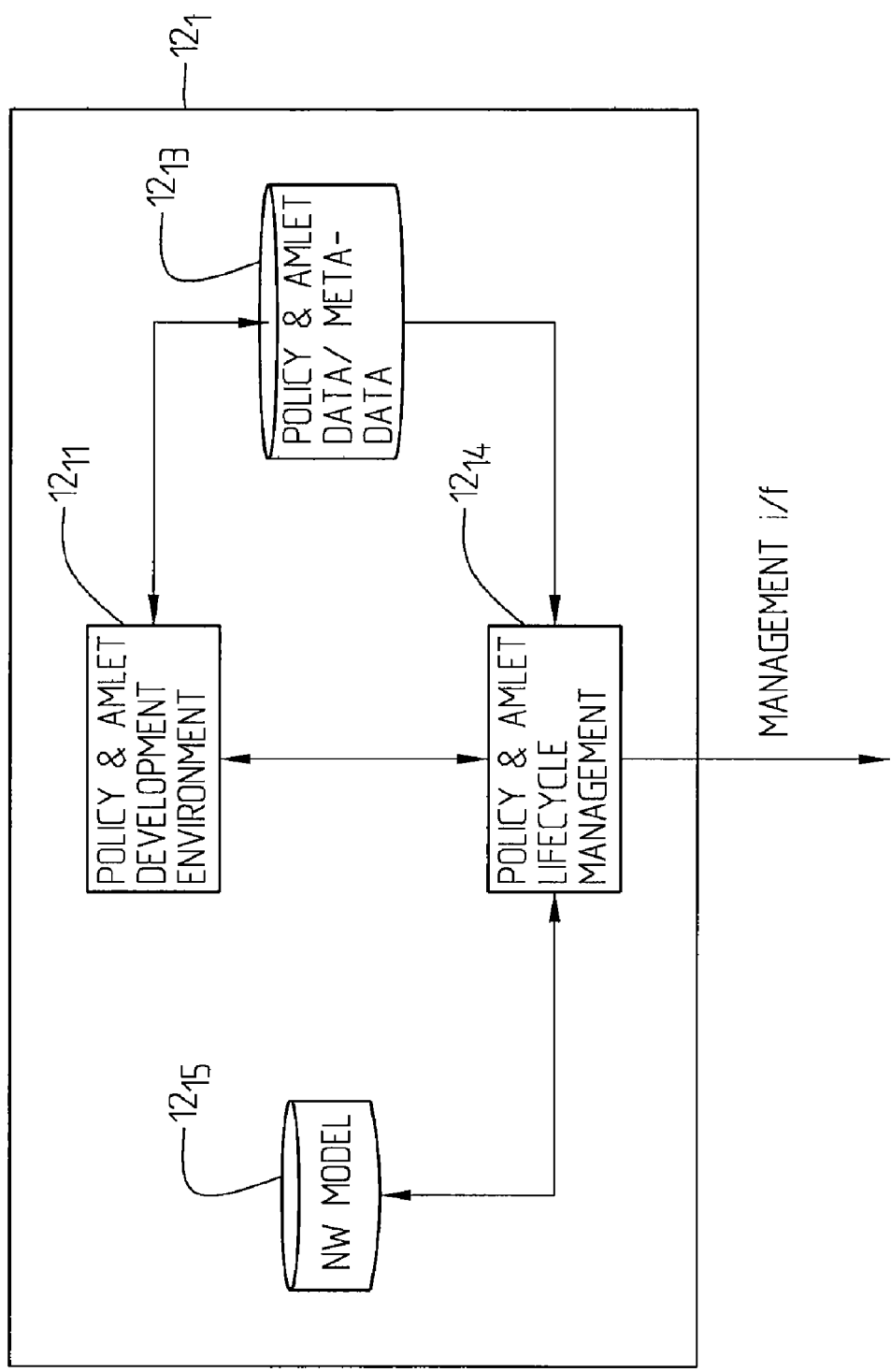
FIG. 5 is a block diagram showing an example in more detail of a processing control managing means of FIG. 4.

A policy and Amlet management module $12_1$ (of the management module $10_1$ of FIG. 4) is shown in FIG. 5. It comprises a policy and Amlet development environment $12_{11}$ allowing for creation and testing of policies and Amlets. The development environment contains language translators and libraries required to enable generation of supporting AVM (Amlet Virtual Machine) software as well as the Amlets themselves. All Amlets and supporting software is stored in an Amlet repository $12_{13}$. The policy and Amlet management sub-module $12_1$ also comprises an Amlet lifecycle management entity which is responsible for deployment of policies and Amlets to network elements $12_{14}$ and their subsequent management once they have been deployed. This management function is facilitated by cooperation with the management element in the policy and Amlet execution environment $21_1$ in the aggregator module $20_1$ as will be described below. The interaction between the policy and Amlet lifecycle management $12_{14}$ and the policy and Amlet execution environment $21_1$ (or in some embodiments corresponding means $11_1$, cf. FIG. 4, in the managing systems) will be further described below. A network model $12_{15}$ is used to facilitate the deployment to the network elements.

Figure 6:
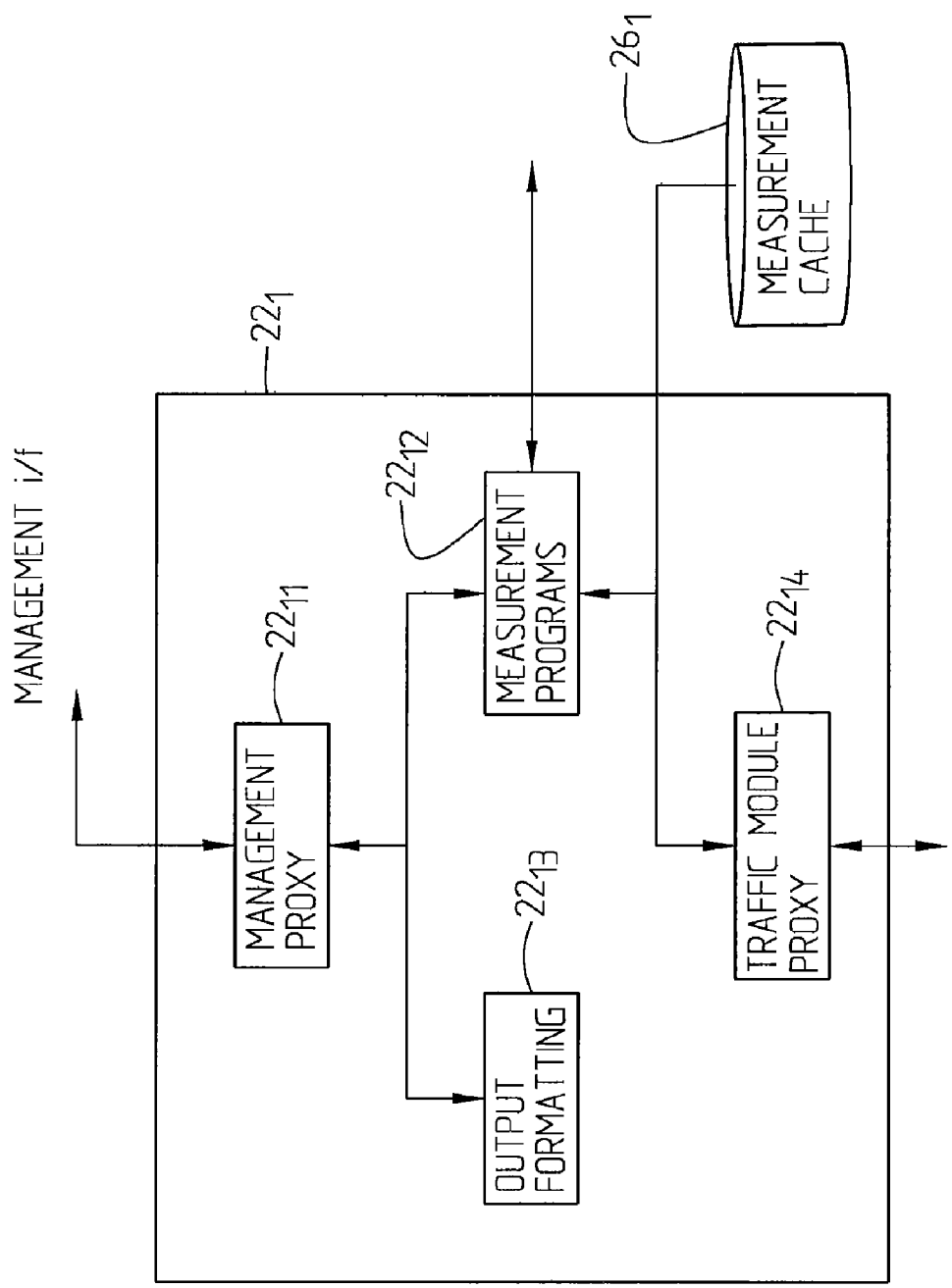
FIG. 6 is a block diagram describing more in detail an implementation of a measurement control module of the aggregator module of FIG. 4.

The measurement control sub-module $22_1$ of the aggregator module $20_1$ may comprise a number of sub-modules or sub-parts as disclosed in FIG. 6. It comprises a management proxy $22_{11}$ abstracting the interface with the management interface entity. Correspondingly a traffic module proxy $22_{14}$ abstracts the interface to the traffic interface entity. The measurement program function $22_{12}$ is a main component of the measurement control sub-module $22_1$ and contains details on which entities are being measured and how often these measurements should be compiled and output. It triggers collection of Amlet results from the policy and Amlet execution environment (PAEE) $21_1$ by sending events to the PAEE $21_1$ to retrieve the results. It also contains information about which output format is to be used for each measurement program. The output formatting module $22_{13}$ compiles the collected measurements into the desired output format for transmission to OSS $10_1$. The measurement cache module $26_1$ is used to store collected results prior to transmission to the management module $10_1$.

Figure 7:
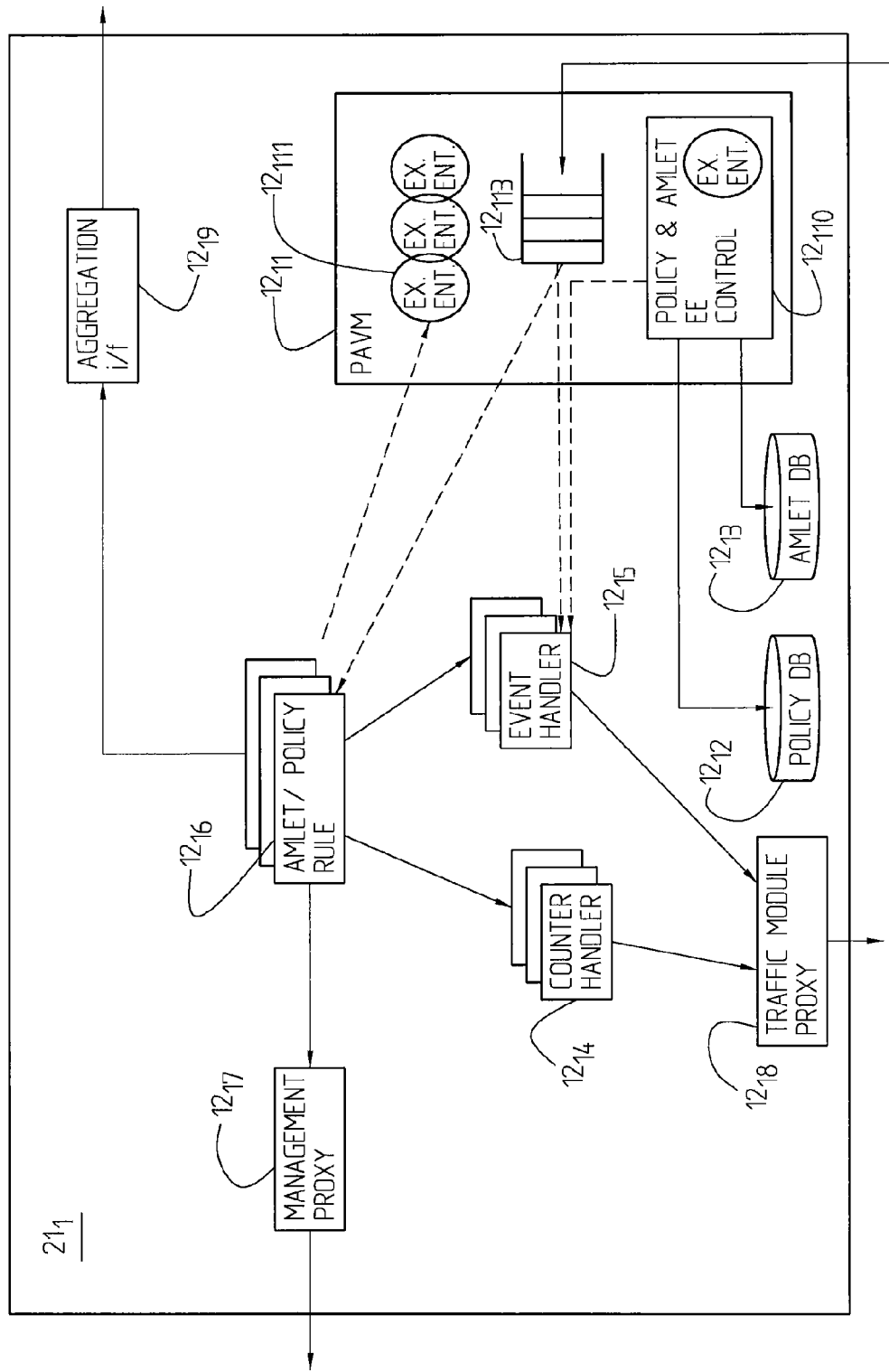
FIG. 7 is a block diagram describing an implementation of a second processing means of the aggregator module described in FIG. 4.

FIG. 7 shows an exemplary implementation of a policy and Amlet execution environment sub-module $21_1$ e.g. as in FIG. 4. This module is a central component of the aggregator module $20_1$ and its primary function is to provide a context and resources for execution of Amlets. Its main component is an Amlet execution environment virtual machine (AVM or PAVM) $12_{11}$ which provides a number of functions including implementing the behaviour (language statements) of the Amlet programming module as described above, providing a process context enabling Amlet execution, i.e. it is responsible for scheduling and dispatching Amlet jobs for execution. It also maps Amlets onto the underlying process model. It further comprises a message handling mechanism for receiving and routing messages to Amlets, and assists in managing the Amlet lifecycle module via the policy and Amlet EE controller $12_{110}$. In FIG. 7 the message handling mechanism (message queue) $12_{113}$ and a number of executable entities $12_{111}$ are also shown. Dashed arrows indicate dispatch of tasks and messages. The PAEE $21_1$ further comprises Amlets/policy rules $12_{16}$, policy and Amlet repositories $12_{12},12_{13}$, a number of event handlers $12_{15}$, a number of counter handlers $12_{14}$ and proxies for traffic module interface $12_{18}$ and management interface $12_{12}$ respectively. In addition thereto it comprises an aggregation interface $12_{19}$ and a management proxy $12_{17}$.

The functioning will be explained below. The Amlets are the actual aggregated measurements and are executed in response to incoming messages. Messages may originate from the traffic module $30_1$ or from the management module $10_1$. All messages are serialized, i.e. placed in series, in AVM message queue $12_{113}$, so that they will be received in the correct order by the Amlets $12_{16}$.

A distinction is made between the handling of counters that are implemented in the traffic module and counters implemented in the PAEE. Some counters are standardized and well known. Such counters are normally most efficiently implemented in the traffic module directly. This applies in particular to simple counters counting the number of occurrences of some given event, for example the number of data packets sent on the downlink. Other counters are not standardized or they are based on the combination of one or more parameters in the underlying protocol event. To calculate these counters it is necessary to process the event data in the aggregator module, in the PAEE $21_1$, rather than in the traffic module. The PAEE subscribes to these events in the traffic module and each time a subscribed protocol event occurs during traffic the PAEE is called. Most specifically the event handler entity ($12_{15}$) for that event is called. All event parameters are available to the concerned event handler $12_{15}$ which then runs through its list of subscribed counters and evaluates the conditions for each counter. The counter is then stepped.

As an example it is supposed (not shown) that counter M1 (from Amlet AM1) and counter M2 (from Amlet AM2) are based on different conditions associated with the event E1 from a traffic protocol. When AM1 executes the "subscribe" statement for M1, a filter is created and attached to event handler EH1. This filter contains both the condition associated with the counter M1 and counter M1 itself. M1 is stepped each time the condition is evaluated to be true. This is also true for AM2. If EH1 does not exist when the AM1 subscription is invoked, then an instance of EH1 is created.

The counters are fetched via the get( ) statement (se below) when the Amlet calculation is executed. If the counter is implemented in the PAEE via an event handler, the counter value is fetched from the event handler. If on the other hand the counter exists in the traffic module, the counter value is read from there instead via a counter handler entity which has been created earlier. This entity is able to access the counter value via the traffic module interface.

Since both counter types are defined in the same way, the Amlet is not aware of the distinction between them and the handling of the counters is transparent to the Amlet.

The Amlets are activated on command by the measurement controller via a message, for example doAm( ) This causes the Amlet to fetch the counters, perform the calculation and return the value to the measurement controller $22_1$ (FIG. 4).

In some embodiments, a functionality corresponding to that described above, particularly of PAVM $12_{11}$, is not provided in the managing system. In still other embodiments it is provided also in the managing system.

Figure 8:
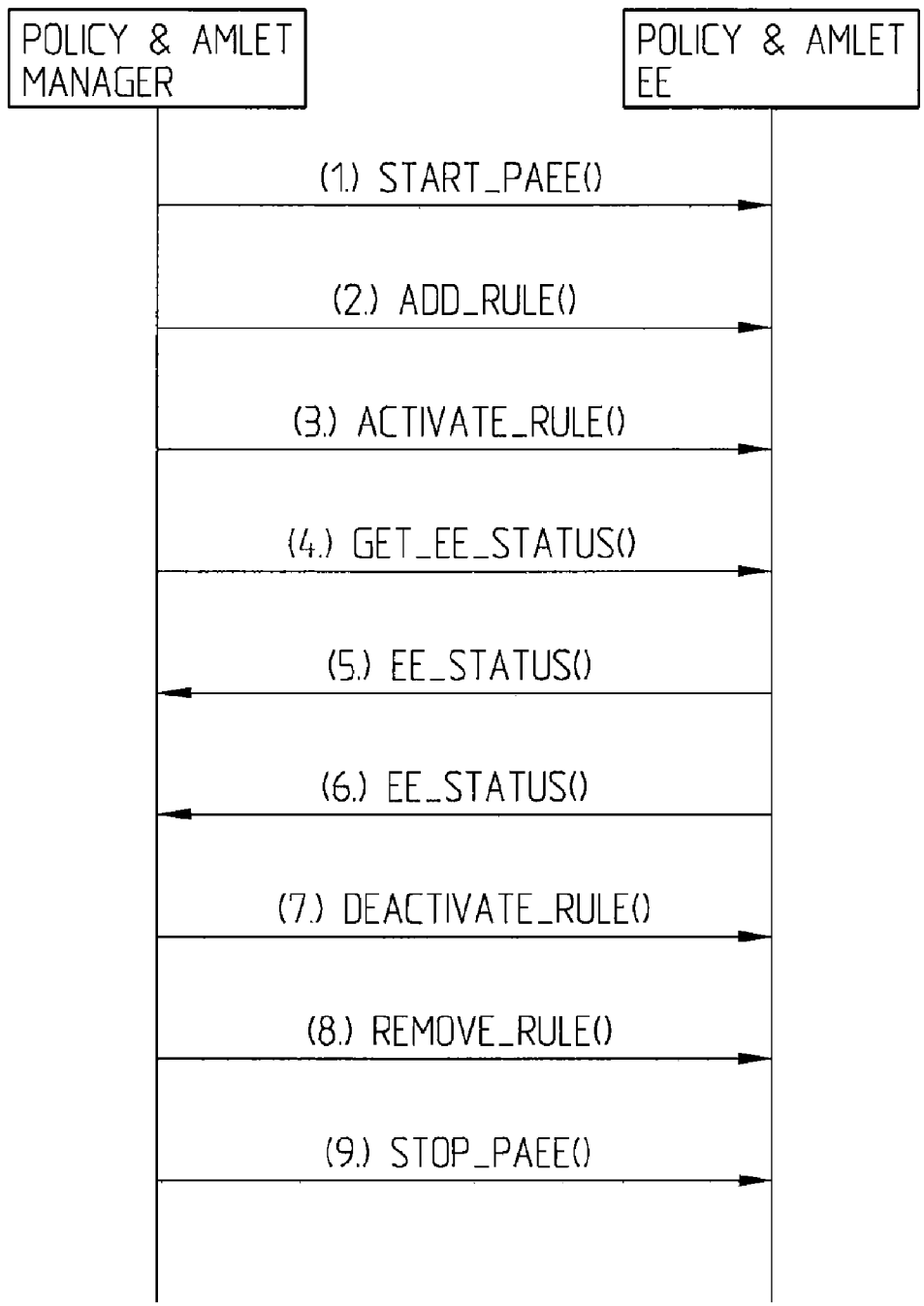
FIG. 8 is a sequence diagram describing the management protocol.

The operation of the system and the policy and Amlet lifecycle management is defined by the management protocol between the policy and Amlet management sub-module $12_1$ and the policy and Amlet execution environment sub-module $21_1$. The basic interaction cycle is shown in FIG. 8 which is a sequence diagram showing the management operations that are used. It should be clear that the inventive concept is not limited to the specifically indicated ordering which may be different.

Start_PAEE (1.) causes the PAEE to be activated from a passive state. This step has to be taken before any Amlets can be run. The AVM is started and resources are allocated. Stop_PAEE has the opposite effect and any active Amlets are deactivated (see sequence step 9 below). The AVM is then stopped and all resources are released and the PAEE adopts a passive, listening, state.

Add_rule (2.) adds one or more Amlets or policy rules to the PAEE, including all their supporting software. Remove_rule removes all traces of the Amlet(s) from the PAEE. Any active Amlets must first be deactivated. Activate_rule causes a Amlet to be scheduled for execution. Memory and other resources are allocated and the Amlet is ready to receive events. Deactive_rule (7.) causes active Amlets to be removed from the execution list and causes resources to be released.

The status of the EE can be read by the management module by means of get_EE_status (4.) which can be transferred spontaneously EE_status (5.), (6.) to the management module from the aggregator module. This enables the management module to monitor and control the operation of the PAEE. The number of active rules/Amlets can be changed in accordance with the business policy of the service provider.

Figure 9:
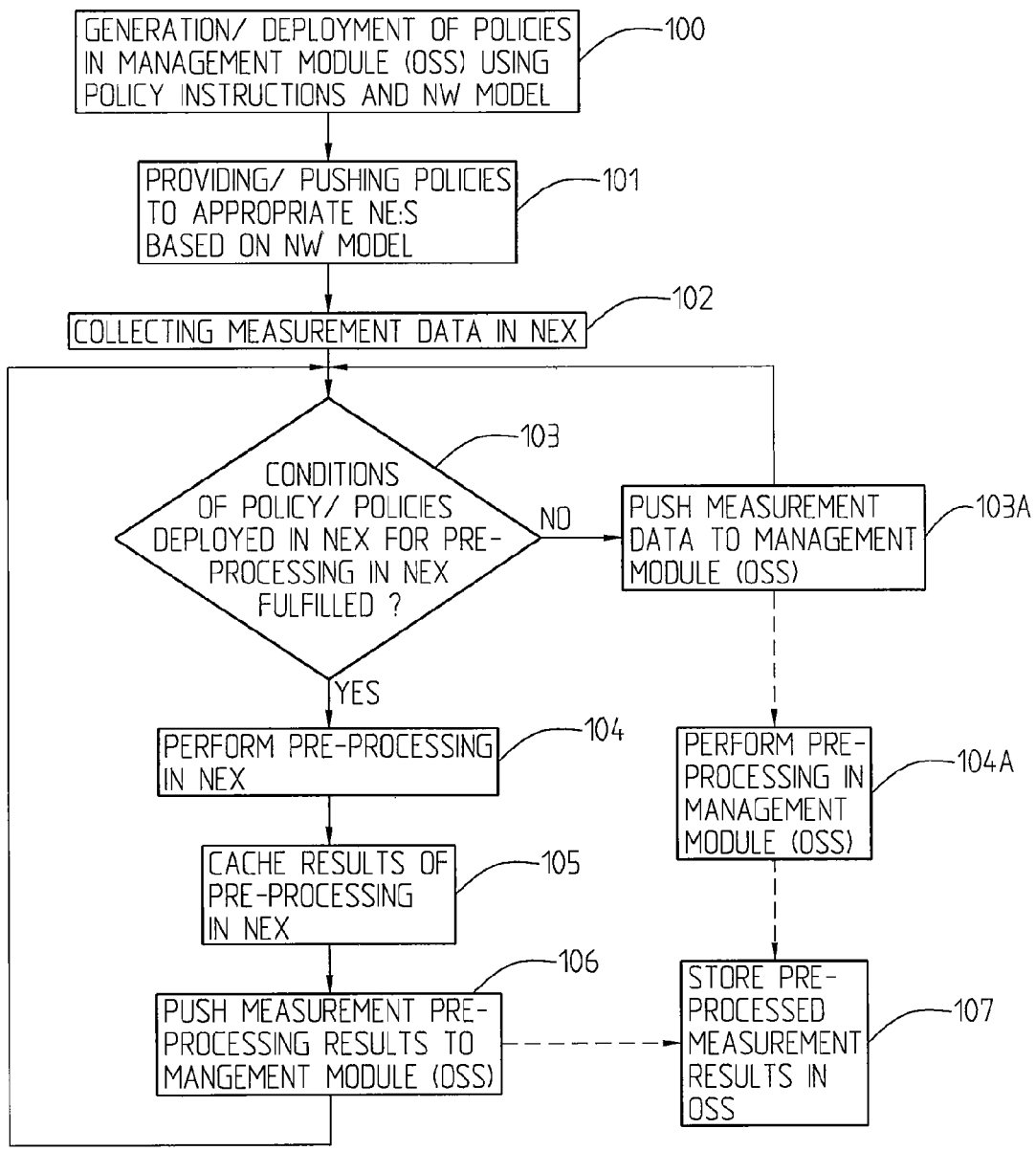
FIG. 9 is a schematical flow diagram describing a procedure according to the inventive concept.

In the flow diagram of FIG. 9 an overview of the main procedural steps according to one embodiment of the present invention are illustrated. Here a number of policies (and possibly also Amlets) are generated or created and deployed in a managing system, particularly in a management module of for example an OSS using policy related instructions received over an operator interface from an operator and taking a network model comprising the network elements of the network into account, 100. When the policies have been deployed, they are provided (spontaneously or regularly or in any appropriate manner), in some embodiments particularly pushed, to the appropriate network elements, or more specifically to aggregator modules located in or associated with respective network elements, based on the network model,

101, i.e. the network model assists in indicating which policies are to be provided to which network elements. (Alternatively (not shown) the decisions concerning where the primary processing is to be done, according to the applicable policies, are made in OSS.)

A similar procedure will take place in each network element, therefore, in the following reference is merely made to a network element denoted NEX. Measurement data is collected in NEX or via a traffic module contained in NEX, in a substantially conventional manner, 102. Based on the specific policy or policies deployed in NEX, it is examined whether the policy conditions concerning at least if pre-processing is to be done or can be done in NEX, are fulfilled, 103. Of course it is also possible to examine if the conditions are not fulfilled etc.

If the conditions are instead not fulfilled, the measurement data is pushed or provided to the management module (for example in an OSS) 103A (the arrow back to box 102 means that this is done repeatedly, according to a given pattern, or at occurrence of given events or spontaneously). There the measurement data will be pre-processed or handled by first primary processing means, 104A. If however it is established that pre-processing may or should be performed in NEX, the pre-processing is performed in NEX, 104, and preferably the results of the pre-processing are cached in NEX, 105. It should be clear that the general aspect of the inventive concept does not deal with the caching, this merely relating to an advantageous implementation, it might also be possible to transfer the results of the primary processing of the pre-processing directly to NEX; this is not intended to have a limiting effect on the scope of the invention. Then, according to any predetermined criteria, with regular time intervals, when the cache is full or according to any other criteria, the results of the pre-processing of the measurements are pushed to the management module or OSS, 106. (The arrow back to box 102 means that measurement data collection is a repeated procedure.) Finally, although not forming part of the general scope of inventive concept, the results of the pre-processing can be stored in OSS or particularly in the management module, 107.

It should be clear that the policies may be of many different kinds, that different conditions may apply or different policies may be provided to different network elements etc. As discussed earlier in the application Amlets may also be handled in the same manner as the policies, or the policies can be seen as including also Amlets. In that case different Amlets may be provided to different network elements, Amlets may be provided only to some of the network elements etc. As referred to above the Amlets describe how the primary processing or the pre-processing is to be carried out and under what conditions etc.

According to the invention flexibility is introduced concerning the location for performing measurement calculations, processing in the performance management architecture formed by the OSS and the NEs it manages. This allows a service provider to operate his performance management system to best meet the relevant objects or goals which are set. This may obviously vary from one provider to another, but one of the advantages is that a service provider can offload processing of measurement calculations to NEs to reduce the amount of data being transferred from the network to the OSS. The range of measurements offloaded in this way can be tailored which means that not all measurements need to be migrated and the set of measurement migrated may be varied at any time dependent on policy. It is also possible to offload measurement calculations to certain NE types and not to others, depending on type of used processor etc. It is also possible to tailor measurement processing in a network element to meet the load conditions in the NE.

It should be clear that the invention can be varied in a number of ways without departing from the scope of the appended claims and it is by no means limited to the specifically illustrated embodiments.

The invention claimed is:

1. An arrangement for performance management in a communication network comprising a managing system and a number of managed systems, said arrangement comprising collecting means for collecting traffic measurement data and primary processing means for primary processing of measurement data, wherein said primary processing means are adapted to be distributed and comprise first primary processing means provided in the managing system and a number of second primary processing means provided in or associated with a number of managed systems and wherein the arrangement comprises processing control means for controlling at least allocation of primary processing of measurement data to a first or a second primary processing means.

2. An arrangement according to claim 1, wherein said processing control means are adapted to allocate primary processing of measurement data to a first and/or second primary processing means based on one or more policies or policy rules.

3. An arrangement according to claim 2, wherein said one or more policies or policy rules comprise one or more predetermined conditions.

4. An arrangement according to claim 2, wherein one or more policy rules or conditions relate to current parameter conditions.

5. An arrangement according to claim 3, wherein a condition states that measurements using an amount of data falling below a given threshold value are to be processed in a second primary processing means, or vice versa that measurements using an amount of data exceeding a given threshold value are to be processed in the first primary processing means.

6. An arrangement according to claim 3, wherein a condition is that measurements based on a number of different types of measurements and/or measurements which incorporate other primary or pre-processed measurements and falling below a given threshold value shall/may be processed in a second primary processing means.

7. An arrangement according to claim 2, wherein the processing control means are adapted to take into account conditions or policy rules relating to one or more of network size, number of managed systems, network load, type of managed system, respective processing capacity, relative processing capacity of a managed system/managing system, and wherein threshold values are given for one or more of said parameters below/above which processing is to be performed in a first or a second processing means.

8. An arrangement according to claim 1, wherein at least the second primary processing means comprise calculation means for performing aggregation calculations of measurements.

9. An arrangement according to claim 1, wherein said policies or policy rules further comprise processing rules defining calculation or processing of measurements.

10. An arrangement according to claim 1, wherein the processing control means comprise first processing control means adapted to generate or provide said policies or policy rules and to distribute said policies or policy rules over a management interface to second processing control means comprising an execution engine in or communicating with said respective second processing means.

11. An arrangement according to claim 10, wherein said first processing control means comprises a management module provided in the managing system, which is adapted to generate and manage said policies or policy rules or conditions and to control generation and management of said processing rules.

12. An arrangement according to claim 10, wherein each second primary processing means and respective collecting means are provided in or communicate with a respective aggregator module provided in or associated with a managed system.

13. An arrangement according to claim 12, wherein the second primary processing means or the aggregator modules comprise a respective traffic module interface for communication with a traffic module comprising control plane processing means and user plane processing means and being adapted to communicate with or comprise control plane and user plane measurement collecting means respectively.

14. An arrangement according to claim 13, wherein the measurement collecting means comprises counters and/or event based counters.

15. A managed system in a communication network comprising or communicating with collecting means adapted to collect traffic measurement data for performance management purposes, wherein the managed system comprises or is associated with second primary processing means for primary processing of collected traffic measurement data and wherein processing control means are provided for determining at least if or when primary processing is to be performed in the second primary processing means.

16. A managed system according to claim 15, wherein the processing control means comprise or implement policies or policy rules.

17. A managed system according to claim 16, wherein the processing control means are distributed and comprise second processing control means comprising an execution engine provided in or associated with the managed system adapted to enable implementation of applicable policy rules and measurement processing, said execution engine being further adapted to receive policies or policy rules from an external processing control management means or a first processing control means.

18. A managed system according to claim 17, wherein the policies or policy rules also comprise calculation or processing rules defining rules at least for performing aggregation calculations.

19. A managed system according to claim 15, comprising an aggregator module, said aggregator module comprising said execution engine and said local, second processing control means, a management interface for communication with a managing system, said aggregator module further being adapted to communicate with a traffic module comprised in the managed system comprising said measurement collecting means.

20. A managed system according to claim 19, wherein the traffic module comprises a control plane processor and a user plane processor for control plane and user plane measurements respectively.

21. A managed system according to claim 20, wherein the measurements are based on counters and/or event based counters.

22. A managed system according to claim 16, wherein the policy rules comprise conditions determining whether given measurements are to be processed in the second processing means or not, said conditions relating to one or more of network size, number of managed systems, load on the second processing means, type of managed system and processing capacity.

23. A managing system in a communications network, adapted to manage a number of managed systems and comprising first primary processing means for primary processing of collected traffic measurement data, wherein the managing system further comprises first processing control means acting as processing control managing means adapted to generate or provide and/or manage allocation handling control information, and/or to distribute said allocation handling control information to second or managed processing control means for controlling allocation of primary processing of measurement data to the first primary processing means or to a second primary processing means provided in a managed system, and a management interface for distributing said allocation handling control information to said managed systems.

24. A managing system according to claim 23, wherein the allocation and handling control information comprise policies or policy rules at least for handling allocation of processing of measurement data.

25. A managing system according to claim 24, wherein the allocation and handling control information further comprise policies or policy rules for controlling measurement processing or calculation.

26. A method for performance management in a communication network comprising a managing system and a number of managed systems and further comprising means for collecting traffic measurement data,
wherein the method comprises the steps of:
generating or providing allocation and handling control information for controlling if or when measurement data is to be handled by primary processing in/by the managing system or in/by a managed system;
using said allocation and handling control information and/or distributing it to managed systems supporting primary processing;
handling collected measurement data through primary processing in a managed system or in the managing system in agreement with the allocation and handling control information.

27. A method according to claim 26,
wherein the allocation and handling control information comprises policies or policy rules based on conditions determining if/when measurement data will or may be processed by primary processing in a managed system and/or in a managing system, and in that primary processing location related decisions are made dynamically or in real-time in a managed and/or a managing system.

28. A method according to claim 27,
wherein the policy rules comprise conditions with thresholds or limits above/below which primary processing is to or may be handled in a managed system and/or when primary processing has to be handled by a managing system.

29. A method according to claim 27,
wherein the allocation control and handling information further comprises policies or policy rules comprising measurement calculation formulae for performing aggregation calculations.

* * * * *